United States Patent
Mikami et al.

(10) Patent No.: US 9,437,179 B2
(45) Date of Patent: Sep. 6, 2016

(54) REVERBERATION SUPPRESSION DEVICE

(75) Inventors: Takashi Mikami, Tokyo (JP); Atsuyoshi Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 113 days.

(21) Appl. No.: 14/238,478

(22) PCT Filed: Jan. 30, 2012

(86) PCT No.: PCT/JP2012/000569
§ 371 (c)(1),
(2), (4) Date: Feb. 12, 2014

(87) PCT Pub. No.: WO2013/114425
PCT Pub. Date: Aug. 8, 2013

(65) Prior Publication Data
US 2014/0192993 A1     Jul. 10, 2014

(51) Int. Cl.
G10K 11/00    (2006.01)
H04R 3/02     (2006.01)
H04M 9/08     (2006.01)
G10L 21/0208  (2013.01)
H04S 7/00     (2006.01)

(52) U.S. Cl.
CPC ............ *G10K 11/002* (2013.01); *H04M 9/082* (2013.01); *H04R 3/02* (2013.01); *G10L 2021/02082* (2013.01); *H04R 2499/13* (2013.01); *H04S 7/00* (2013.01); *H04S 2420/05* (2013.01)

(58) Field of Classification Search
None
See application file for complete search history.

(56) References Cited

U.S. PATENT DOCUMENTS

| | | | |
|---|---|---|---|
| 6,377,637 B1 * | 4/2002 | Berdugo | G10L 19/0208 375/285 |
| 7,333,605 B1 * | 2/2008 | Zhang et al. | 379/406.08 |
| 2003/0135364 A1 * | 7/2003 | Chandran | G10L 21/0208 704/226 |
| 2004/0228474 A1 | 11/2004 | Taniguchi et al. | |
| 2012/0281855 A1 | 11/2012 | Kitago et al. | |

FOREIGN PATENT DOCUMENTS

| | | |
|---|---|---|
| JP | 2-192335 | 7/1990 |
| JP | 6-22025 | 1/1994 |
| JP | 2004-297791 | 10/2004 |
| JP | 2007-67549 | 3/2007 |
| JP | 2009-21859 | 1/2009 |
| JP | 2010-41667 | 2/2010 |
| JP | 2010-151965 | 7/2010 |
| JP | 2011-114758 | 6/2011 |

OTHER PUBLICATIONS

International Search Report issued Mar. 19, 2012, in PCT/JP12/000569 filed Jan. 30, 2012.

\* cited by examiner

*Primary Examiner* — Wayne Young
*Assistant Examiner* — Mark Fischer
(74) *Attorney, Agent, or Firm* — Oblon, McClelland, Maier & Neustadt, L.L.P

(57) ABSTRACT

A reverberation suppression device comprises: an echo canceller that removes an echo component included in an input signal; a howling suppressor that detects occurrence of howling based on a frequency characteristic of the input signal from which the echo component has been removed and attenuates a frequency level of a component of the detected howling; and an initial sound suppressor that detects a sound section of the input signal in which the frequency level of the howling component has been attenuated and suppresses a signal value at a sound start portion of the detected sound section.

8 Claims, 3 Drawing Sheets

(a) Example of Input (b) Application of Formula (1)

(c) Application of Formulas (9) to (11)

REVERBERATION SUPPRESSION DEVICE

TECHNICAL FIELD

The present invention relates to a reverberation suppression device that suppresses an echo component mixed in an input signal.

BACKGROUND ART

In an environment where there are front and back seats like an interior of an automobile, sounds generated at the front seat are difficult to be transmitted to the back seat due to the sound directivity. As a result, it is difficult to have a conversation. In addition, during driving, it becomes more difficult to have the conversation due to the masking effect of driving sound noise. In order to solve such problems, there is a technique for assisting conversations by a microphone and a speaker. According to this technique, in order to perform sound enhancement, sound collection by a microphone is performed at a location where the SN ratio (signal-to-noise ratio) is higher compared to that for the back seat, and an output by a speaker is performed near the back seat. Such system in a small room like the interior of the automobile brings about a closed-loop system, and thereby a howling or an echo occurs by a speaker output collected by the microphone. Hence, in general, a howling canceller, an echo canceller, etc., are mounted. However, those cancellers are for suppressing the howling or the echo in an output signal, but are not for suppressing reverberation in a sound field which is mixed in the room. In a small room, an original sound signal (i.e. an audible sound without passing through the microphone) is also present. Therefore, if a speaker output is mixed with the original sound signal, a sense of reverberation occurs in a room sound-field even when the speaker output itself does not include reverberation.

In addition, when a speaker output is performed from the back with large in sound level, the original sound from the front cannot be heard, impairing front localization. When the speaker output is delayed, front localization can be obtained due to the Haas effect. However, it causes a sense of reverberation, resulting in a double sound depending on the amount of delay.

For dealing with the foregoing problems, there is a Patent Literature 1 that discloses an echo canceller that determines a call state in a hands-free call, a telephone conference system, etc., to change a parameter, and performs echo cancellation according to the circumstances. In addition, there is a Patent Literature 2 that discloses a howling suppression device that suppresses reverberation in a field by performing frequency band division for a speaker output under an environment where reverberation occurs, to adjust the gains of adjacent frequency bands.

Patent Literature 1: JP 2009-021859 A
Patent Literature 2: JP 2010-151965 A

SUMMARY OF INVENTION

However, the echo canceller disclosed in the above-described Patent Literature 1 is a technique related to echo cancellation of a microphone input, and thus, has a problem that the echo canceller cannot suppress reverberation in a room sound-field. The howling suppression device disclosed in Patent Literature 2 requires high-load processing such as an FFT, and thus a great delay may occur. It causes a double sound in an environment where the original source is present. Therefore, there is a problem that the howling suppression device disclosed in Patent Literature 2 is not appropriate for assisting conversations.

The invention is made to solve such problems described above. An object of the present invention is to suppress, in an environment provided with a microphone and a speaker, a sense of reverberation occurring in a sound field due to a mixture of the original sound signal and the speaker output with respect to a sound system where a speaker output is input to the microphone.

A reverberation suppression device according to the invention includes: an initial sound suppressor that detects a sound section of the input signal, and suppresses a signal value at a sound start portion of the detected sound section.

According to the present invention, a signal value at a sound start portion is suppressed, enabling to suppress a sense of reverberation occurring in a sound field.

DESCRIPTION OF EMBODIMENT

Embodiments for implementing the present invention will be described below with reference to the accompanying drawings.

Embodiment 1

Figure 1:
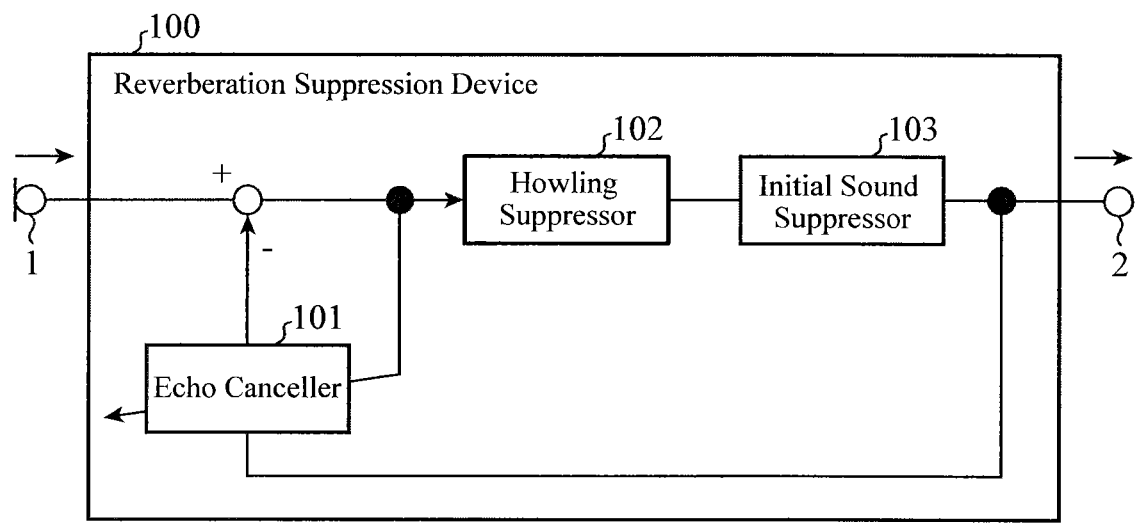
FIG. 1 is a block diagram depicting a configuration of a reverberation suppression device according to Embodiment 1.

FIG. 1 is a block diagram depicting a configuration of a reverberation suppression device according to Embodiment 1.

In FIG. 1, a reverberation suppression device 100 to which a microphone 1 as an input terminal is connected comprises an echo canceller 101, a howling suppressor 102, and an initial sound suppressor 103. A speaker 2 as an output terminal is connected subsequent to the initial sound suppressor 103.

The echo canceller 101 estimates an echo component in a microphone input signal from a speaker output signal by using the microphone input signal as a reference signal, and removes the estimated echo component. The howling suppressor 102 detects and suppresses a howling in the microphone input signal. The initial sound suppressor 103 weakens and suppresses a signal value at a start portion of a sound section (hereinafter "an initial sound") of the microphone input signal.

Next, a detailed operation of each configuration will be described.

The echo canceller 101 uses an NLMS (Normalised least mean squares filter) adaptive filter. The echo canceller 101 buffers a signal which is immediately before outputted from the speaker 2 to use this signal as an input to the NLMS, and uses a microphone input signal of the microphone 1 as a reference signal to estimate an echo component in the microphone input signal. The residual between the microphone input signal and the estimated signal corresponds to an echo-removed signal. Although an example of using NLMS as an adaptive filter is shown, other adaptive filters such as LMS (Least mean squares filter), RLS (Recursive Least Squares), and an affine projection filter may be applied.

The howling suppressor 102 detects or estimates a howling in the microphone input signal to the microphone 1 and removes the howling. The howling suppressor 102 can be composed using known techniques, e.g., a notch filter and an adaptive notch filter. The notch filter is a filter that reduces the gain of a preset frequency. The adaptive notch filter is a filter that detects a frequency where the power of signal values is strong, and reduces the gain of the frequency.

Figure 2:
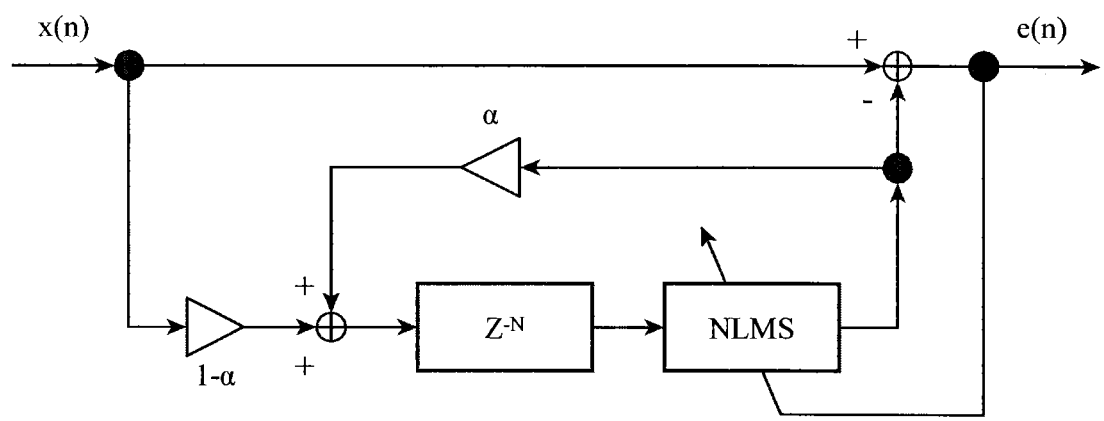
FIG. 2 is a diagram depicting an example of a feedback suppressor applied to a howling suppressor of the reverberation suppression device according to Embodiment 1.

Alternatively, howling suppression by an adaptive filter called a feedback suppressor may be performed. FIG. 2 is a diagram depicting an example of the feedback suppressor. Note that a is a parameter satisfying a condition of $0 \le \alpha \le 1$. By the NLMS adaptive filter, a frequency band where the power of signal values is strong can be adaptively removed.

Figure 3:
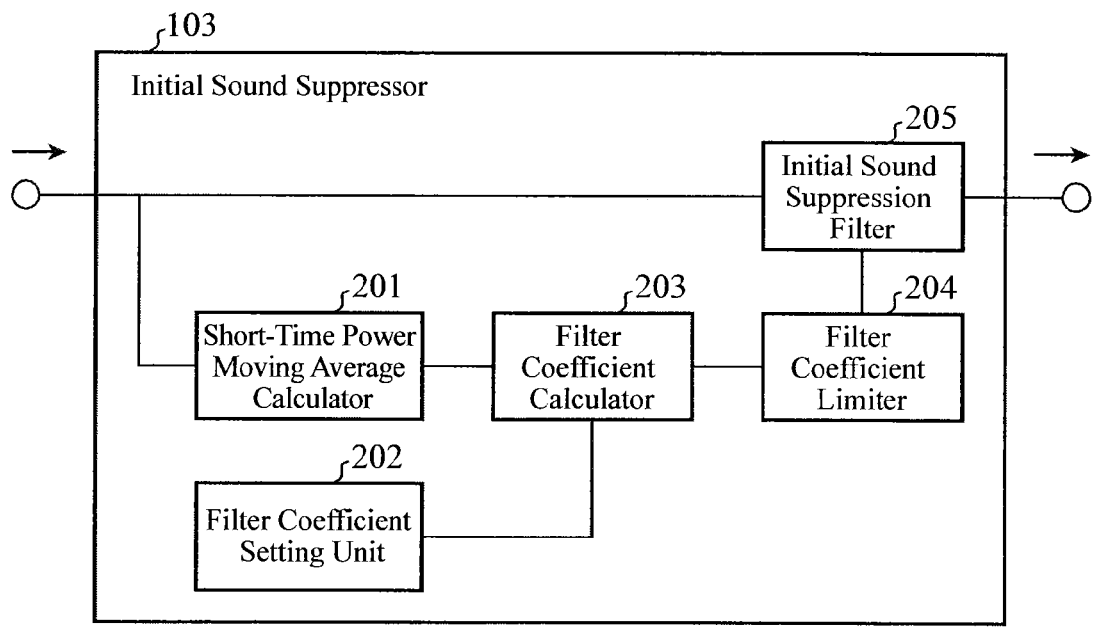
FIG. 3 is a block diagram depicting a configuration of an initial sound suppressor of the reverberation suppression device according to Embodiment 1.

The initial sound suppressor 103 is a filter that suppresses a start portion of a sound section, i.e., the initial sound. FIG. 3 is a block diagram depicting a configuration of the initial sound suppressor of the reverberation suppression device according to Embodiment 1.

The initial sound suppressor 103 comprises: a short-time power moving average calculator 201 that calculates a moving average of the power of the signal values (hereinafter "power") of an input signal; a filter coefficient setting unit 202 that sets a fixed parameter of a filter coefficient; a filter coefficient calculator 203 that calculates a filter coefficient using the fixed parameter set by the filter coefficient setting unit 202 and the power moving average value calculated by the short-time power moving average calculator 201; a filter coefficient limiter 204 that defines an upper limit to the filter coefficient; and an initial sound suppression filter 205 that converts the signal value of the input signal on a basis of the filter coefficient determined by the filter coefficient calculator 203 and the filter coefficient limiter 204.

The initial sound suppressor 103 composes a filter using a power moving average described in below. First, the short-time power moving average calculator 201 calculates a power moving average p based on the following formula (1):

$$p = (1-\text{ratio}) \sim p + \text{ratio} \cdot x^2 \tag{1}$$

The filter coefficient setting unit 202 sets a fixed parameter A used for a filter coefficient which depends on the characteristics of an input signal.

Next, the filter coefficient calculator 203 determines a filter coefficient by the following formula (2) using the power moving average p and the fixed parameter A:

$$\frac{\sqrt{p}}{A} \tag{2}$$

The filter coefficient limiter 204 defines the upper limit value of the filter coefficient as "1". The initial sound suppression filter 205 multiplies the signal value of the original sound signal by the obtained filter coefficient through the following formula (3) and thereby obtains a filtered signal value x':

$$x' = x \cdot \min\left(1, \frac{\sqrt{p}}{A}\right) \tag{3}$$

Note that, in the formulas (1) and (3), "x" indicates the signal value of the original sound signal, and "ratio" indicates the coefficient of the moving average ($0 \le \text{ratio} \le 1$).

The power of a soundless section is smaller than that of a sound section. The power moving average has a hysteresis characteristic. Hence, when the power moving average p is calculated based on the above-described formula (1), the value of p decreases at the start portion of the sound section due to the influence of the preceding soundless section. As a result, the filtered signal value x' decreases. In the sound section, the power moving average p increases, and also the filtered signal value x' increases. Note that, since $\sqrt{p/A}$ is limited to "1" or less, the filtered signal value x' does not become greater than the signal value x of the original sound signal. The fixed value A can be preset according to the characteristics of the input signal such that $\sqrt{p/A}$ is on the order of "1" or more for the sound section and is less than "1" for the soundless section.

Although the above-described formula (1) calculates the power moving average p by using $x^2$, the variance V(x) of the signal value x of the original sound signal can be alternatively used. The variance V(x) can be appropriately obtained from a moving average, as shown in the following formulas (4) and (5):

$$M = (1-\text{ratio}) \sim M + \text{ratio} \cdot x \tag{4}$$

$$V = (1-\text{ratio}) \sim V + \text{ratio} \cdot (x-M)(x-M) \tag{5}$$

In the formulas (4) and (5), "M" corresponds to the average value of the signal value x of the original sound signal.

Alternatively, mean deviation may be used instead of $\sqrt{p}$ in the above-described formula (3). The mean deviation Mdev can be approximately obtained from a moving average such as that shown in the following formula (6):

$$\text{Mdev} = (1-\text{ratio}) \sim \text{Mdev} + \text{ratio} \cdot |x-M| \tag{6}$$

As described above, according to Embodiment 1, it is configured to include the echo canceller 101 that removes an echo component from an input signal; the howling suppressor 102 that detects and suppresses howling in the input signal; and the initial sound suppressor 103 that suppresses a signal value at a start portion of a sound section of the input signal. Accordingly, the signal value of the initial sound is weakened in the speaker output, enabling to reduce a sense of reverberation even if the speaker output is mixed with the original sound signal.

Furthermore, according to Embodiment 1, it is configured such that the filtered signal value x' obtained by filtering in the initial sound suppressor 103 decreases in sections other than the sound section. Thus, noise can be prevented from being outputted from the speaker. Moreover, since the original sound signal is heard strongly at the start portion of the sound section, the Haas effect is expected.

The Haas effect is an effect that humans feel a sound from a direction where the sound is initially heard. In general, in order to provide the Haas effect, it is configured to delay a speaker output. In contrast, the reverberation suppression device of Embodiment 1 can provide the Haas effect without delaying the speaker output.

In addition, according to Embodiment 1, the initial sound suppressor 103 is configured to include: the short-time power moving average calculator 201 that calculates a moving average of the power p of an input signal; the filter coefficient setting unit 202 that sets a fixed parameter A in a filter coefficient according to the characteristics of the input signal; the filter coefficient calculator 203 that calculates a filter coefficient based on the power moving average p and the fixed parameter A; the filter coefficient limiter 204 that sets an upper limit value of the filter coefficient; and the initial sound suppression filter 205 that converts the signal value of the input signal using the filter coefficient or the upper limit value of the filter coefficient. Accordingly, the value of p decreases at the start portion of the sound section due to the influence of the preceding soundless section, and thus the filtered signal value x' decreases. By this, a signal value at the start portion of the sound section can be weakened.

Although the above-described Embodiment 1 presents an example in which the initial sound suppressor 103 is composed of a filter using a power moving average, the initial sound suppressor 103 may be composed of other means. For example, a configuration is considered in which a sound section is detected by a publicly known sound section detecting means, and the output gain is set to be small during a certain period after the start of the sound section.

Embodiment 2

Embodiment 2 presents a different configuration than that of the above-described initial sound suppressor 103.

Figure 4:
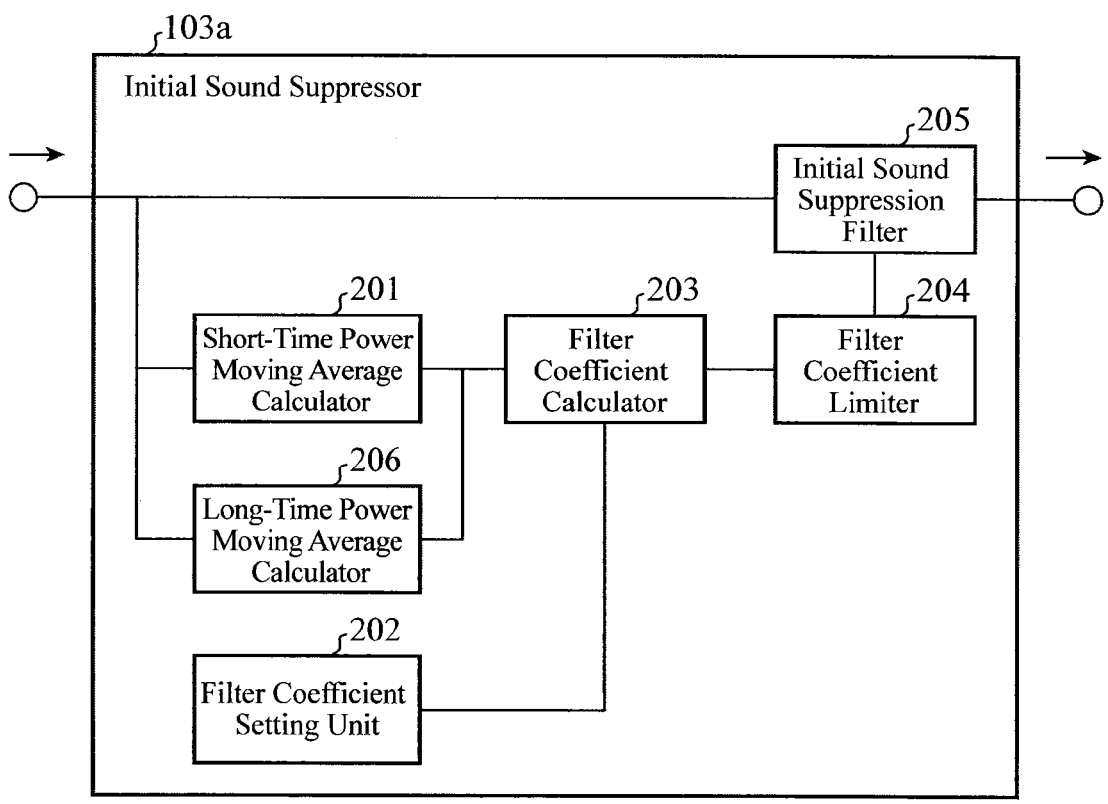
FIG. 4 is a block diagram depicting a configuration of an initial sound suppressor of a reverberation suppression device according to Embodiment 2.

FIG. 4 is a block diagram depicting a configuration of an initial sound suppressor of a reverberation suppression device according to Embodiment 2. An initial sound suppressor 103a of Embodiment 2 is equivalent to the initial sound suppressor 103 of Embodiment 1 to which a long-time power moving average calculator 206 is added. Note that, in the following description, the same or corresponding portions to the components of a reverberation suppression device 100 and the initial sound suppressor 103 according to Embodiment 1 are denoted by the same reference signs as those used in Embodiment 1, and description thereof is omitted or simplified.

The long-time power moving average calculator 206 calculates a moving average of the power of an input signal for a longer range compared to that of a short-time power moving average calculator 201. Specifically, the long-time power moving average is calculated based on the following formula (7):

$$p_{long} = (1 - \text{ratio}_{long}) \cdot p_{long} + \text{ratio}_{long} \cdot x^2 \quad (7)$$

A variation parameter A in a filter coefficient set used in a filter coefficient setting unit 202 is set based on the following formula (8):

$$A^2 = p_{long} + B$$

$$A = \sqrt{A^2} \quad (8)$$

Note that in the above-described formulas (7) and (8), "B" is a constant value which satisfies a condition of $0 \leq \text{ratio}_{long} < \text{ratio} \leq 1$.

By calculating a power moving average for a longer range by the long-time power moving average calculator 206, the variation parameter A can be automatically determined according to the characteristics of an input signal. For example, when noise power is large, the power moving average p becomes always large. In this case, according to the initial sound suppressor 103 presented in Embodiment 1, the filter coefficient $\sqrt{p}/A$ obtained after processed by a filter coefficient limiter 204 becomes always "1". In order to prevent this problem, the variation parameter A is required to have a large value. However, if the variation parameter A is set to be large and thereby the noise power decreases, the filter coefficient $\sqrt{p}/A$ reaches a value close to "0" and accordingly a sound is not outputted. On the other hand, according to Embodiment 2, a power moving average is calculated for a longer range to automatically adjust the variation parameter A, enabling to circumvent the above-described problem.

As described above, according to Embodiment 2, it is configured to include the long-time power moving average calculator 206 that calculates a long-time power moving average $p_{long}$ for a longer range than that of the short-time power moving average calculator 201, and configured to calculate a variation parameter A in a filter coefficient used by a filter coefficient calculator 203 using the calculated long-time power moving average $p_{long}$. Accordingly, the variation parameter A can be automatically determined according to the characteristics of an input signal, and an appropriate variation parameter A can be set according to fluctuations in noise power, enabling to perform a stable sound output.

Embodiment 3

Embodiment 3 presents another different configuration than that of the initial sound suppressor 103.

Figure 5:
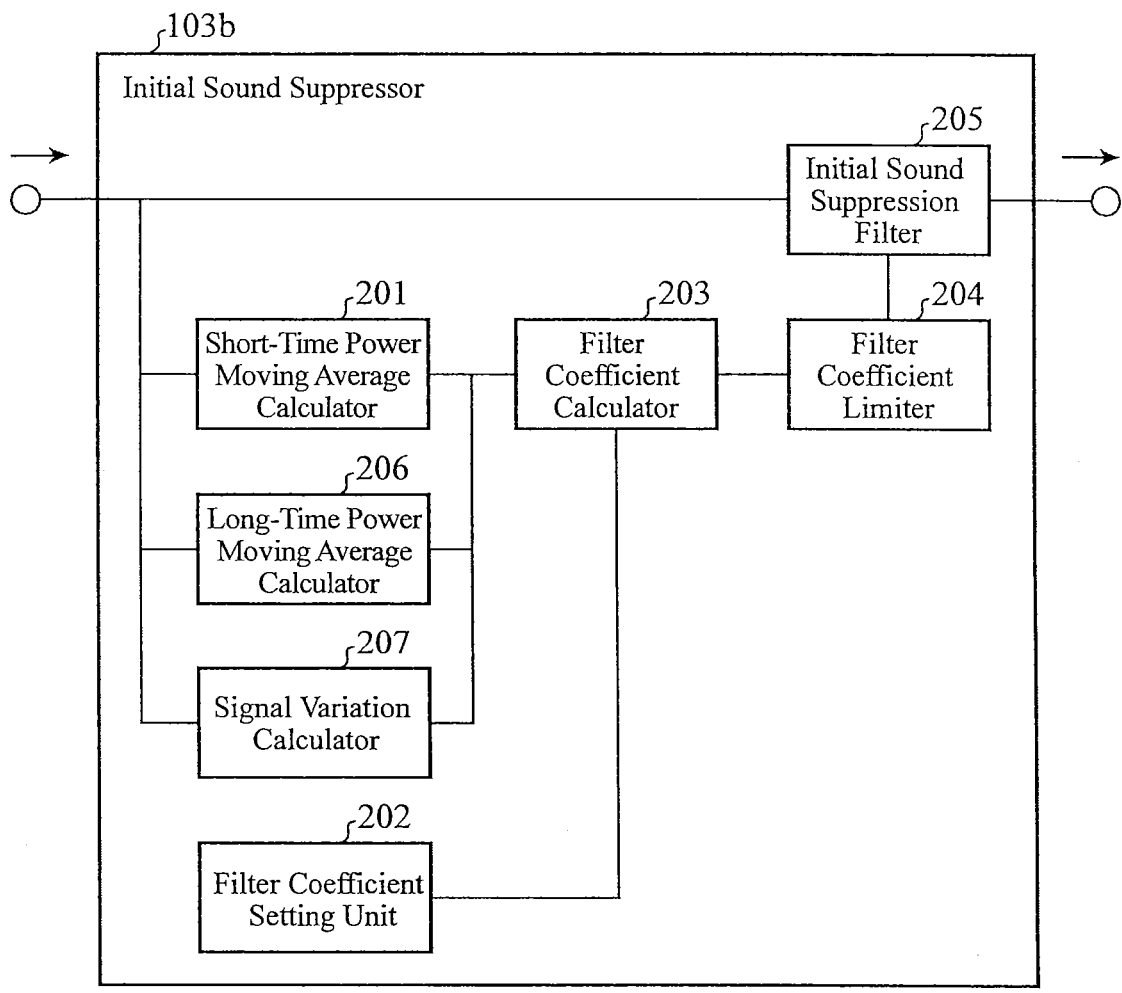
FIG. 5 is a block diagram depicting a configuration of an initial sound suppressor of a reverberation suppression device according to Embodiment 3

FIG. 5 is a block diagram depicting a configuration of an initial sound suppressor of a reverberation suppression device according to Embodiment 3. An initial sound suppressor 103b of Embodiment 3 is equivalent to the initial sound suppressor 103a of Embodiment 2 with which a signal variation calculator 207 is additionally provided. Note that in the following the same or corresponding portions to the components of reverberation suppression devices 100 and initial sound suppressors 103 and 103a according to Embodiment 1 and Embodiment 2 are denoted by the same reference signs as those used in Embodiment 1 and Embodiment 2, and description thereof is omitted or simplified.

The signal variation calculator 207 calculates an average of differences between input signal values to monitor a variation of the signal value of the input signal. Specifically, the variation $\text{diff}_n$ in signal value is calculated based on the following formula (11). In this Embodiment 3, the value of "ratio" defined in the above-described each formula (1), (4), (5), and (6) is calculated based on formulas (9) to (11) shown below.

$$\text{ratio}_n = \begin{cases} (\text{ratio}_{max} - \text{ratio}_{min}) \cdot VR(x) + \text{ratio}_{min} & \text{if } \text{diff}_n > 0 \\ \text{ratio}_{max} & \text{else} \end{cases} \quad (9)$$

$$VR(x) = E\left[\frac{\sqrt{V_{short}(x)}}{\sqrt{V_{long}(x)} + B}\right] \quad (10)$$

$$\text{diff}_n = (1 - \text{ratio}_{max}) \cdot \text{diff}_{n-1} + \text{ratio}_{max} \cdot (x_n - x_{n-1}) \quad (11)$$

In the formulas (9) to (11), "$V_{short}(x)$" and "$V_{long}(x)$" indicate a short-time variance and a long-time variance of x, respectively, and "E" indicates an expected value. The "ratio" satisfies the condition of $0 \leq ratio_{min} < ratio_{max} 1$. The formula (11) corresponds to the process performed by the signal variation calculator 207.

As such, the signal variation calculator 207 detects the variation of the signal value of an input signal. According to the formulas (9)-(11), when the variance of the signal value x does not change much, the coefficient of the moving average is small, i.e., hysteresis increases. Thus, the power moving average p does not increase easily After that, when the power moving average p gradually increases as the variance increases, and hysteresis decreases after an initial sound has ended. That is, after completion of a sound section, the power moving average p decreases promptly.

Figure 6:
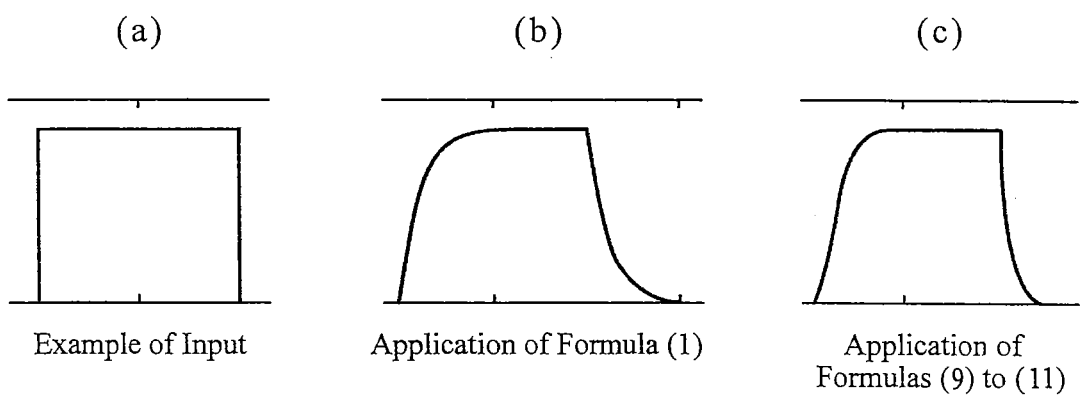
FIG. 6 is a diagram depicting the characteristics of power moving averages of the reverberation suppression devices according to Embodiments 1 and 3.

FIG. 6 is a diagram depicting the characteristics of power moving averages after application of the filters of the reverberation suppression devices of Embodiments 1 and 3. FIG. 6(*a*) represents the original sound signal of an input signal. FIG. 6(*b*) represents the characteristic of a power moving average to which the filter based on the formula (1) is applied. FIG. 6(*c*) represents the characteristic of a power moving average to which the filter based on the formulas (9) to (11) is applied. According to the characteristic of FIG. 6(*c*), compared to that of FIG. 6(*b*), the rise of the input signal is moderate and the fall is abrupt. Namely, the signal value of an initial sound can be suppressed, and a sense of reverberation can be suppressed. Note that, since the fall is abrupt comparably to that of Embodiment 2, an output signal in a noise section can be promptly made small.

As described above, according to Embodiment 3, it is configured to include the signal variation calculator 207 that monitors the amount of variation of the signal value of an input signal, and to calculate the coefficient "ratio" of a moving average taking into account the amount of variation of signal value. Therefore, a filter with a moderate signal rise and an abrupt signal fall can be configured. Accordingly, a signal value at a start portion of a sound section can be suppressed, and a sense of reverberation can be suppressed.

Note that, although the above-described Embodiment 3 presents a configuration in which the signal variation calculator 207 is applied to the initial sound suppressor 103*a* of Embodiment 2, the signal variation calculator 207 may be applied to the initial sound suppressor 103 of Embodiment 1.

In the invention of the present application, free combinations of Embodiments or modifications of any component in Embodiments or omissions of any component in Embodiments can be made within the scope of the present invention.

As described above, a reverberation suppression device according to the present invention can suppress a signal value at a start portion of a sound section which is effective in reduction of a sense of reverberation in a sound field, and thus is suitable to be used for suppression of reverberation of various devices having a microphone and a speaker.

The invention claimed is:

1. A reverberation suppression device comprising:
an input terminal that receives an input signal, the input signal being generated from sound;
circuitry that
calculates a filter coefficient based on a moving average of input signals of sound and a parameter, and
suppresses a signal value of the input signal using the calculated filter coefficient to generate an output signal; and
an output terminal that outputs the output signal,
wherein the parameter is set so that the filter coefficient is at least 1 for a sound section of the input signal, and so that the filter coefficient is less than 1 for a soundless section of the input signal.

2. The reverberation suppression device according to claim 1, wherein the circuitry further:
converts a signal value of the input signal on a basis of the filter coefficient;
refers to the signal value of the input signal, and calculates short-time power by taking a moving average of power of signal values for a predetermined time period to smooth said power of signal values;
calculates the filter coefficient by using the short-time power calculated and the parameter of the filter coefficient set; and
sets an upper limit value of the filter coefficient,
wherein the circuitry converts the signal value of the input signal on a basis of the filter coefficient or the upper limit value of the filter coefficient.

3. The reverberation suppression device according to claim 2, wherein the circuitry further refers to the input signal, and calculates long-time power by taking a moving average of power of signal values for a time period to smooth said power of signal values, the time period being longer than the time period used to calculate the short-time power,
wherein the parameter is set on a basis of the long-time power calculated.

4. The reverberation suppression device according to claim 3, wherein the circuitry further calculates variation of the signal value of the input signal, and detects variations of signal values at a sound start portion and a sound end portion of the sound section by using a hysteresis characteristic which depends on the calculated variations,
wherein the filter coefficient is calculated by using the variations of signal value at the sound start portion and the sound end portion of the sound section, the short-time power, and the parameter of the filter coefficient.

5. The reverberation suppression device according to claim 2, wherein the circuitry further calculates variation of the signal value of the input signal, and detects variations of signal values at a sound start portion and a sound end portion of the sound section by using a hysteresis characteristic which depends on the calculated variations,
wherein the filter coefficient is calculated by using the variations of signal value at the sound start portion and the sound end portion of the sound section, the short-time power, and the parameter of the filter coefficient.

6. The reverberation suppression device according to claim 2, wherein the circuitry sets the upper limit value to 1.

7. The reverberation suppression device according to claim 1, wherein the circuitry further limits the filter coefficient to have an upper limit value of 1 when calculating the filter coefficient, and suppresses the signal value of the input signal by performing multiplication between the input signal and the filter coefficient.

8. The reverberation suppression device according to claim 1, wherein the circuitry is configured to calculate the filter coefficient by the following formula:

$$\frac{\sqrt{p}}{A}$$

where p denotes the moving average of the input signals, and A denotes the parameter.

* * * * *